(12) United States Patent
Franklin et al.

(10) Patent No.: US 7,218,824 B2
(45) Date of Patent: May 15, 2007

(54) LIGHT EMITTING DEVICE

(75) Inventors: James Bruce Franklin, Camperdown (AU); Geoffrey Burton Smith, Epping (AU); Edmond Kenneth Joseph, Burleigh (AU)

(73) Assignee: University of Technology Sydney, Sydney, New South Wales (AU)

( * ) Notice: Subject to any disclaimer, the term of this patent is extended or adjusted under 35 U.S.C. 154(b) by 0 days.

(21) Appl. No.: 10/528,319

(22) PCT Filed: Sep. 18, 2003

(86) PCT No.: PCT/AU03/01225

§ 371 (c)(1),
(2), (4) Date: Oct. 24, 2005

(87) PCT Pub. No.: WO2004/027474

PCT Pub. Date: Apr. 1, 2004

(65) Prior Publication Data

US 2006/0153511 A1   Jul. 13, 2006

(30) Foreign Application Priority Data

Sep. 18, 2002   (AU)  .............................. 2002951465

(51) Int. Cl.
G02B 6/032 (2006.01)
G02B 6/02 (2006.01)
G02B 6/00 (2006.01)
G02B 6/26 (2006.01)

(52) U.S. Cl. ...................... 385/125; 385/123; 385/141; 385/31

(58) Field of Classification Search ................ 385/125, 385/141, 31, 123
See application file for complete search history.

(56) References Cited

U.S. PATENT DOCUMENTS

| 4,466,697 A | * | 8/1984 | Daniel ........................ 385/123 |
| 4,733,929 A | * | 3/1988 | Brown ........................ 385/31 |
| 5,117,472 A | | 5/1992 | Blyler, Jr. et al. |
| 5,257,329 A | | 10/1993 | Blyler, Jr. et al. |

FOREIGN PATENT DOCUMENTS

| GB | 1558404 A | 1/1980 |
| WO | WO 02/095289 A | 11/2002 |

OTHER PUBLICATIONS

Zhao et al., Optical Elements for Mixing Colored LEDs to Create White Light, SPIE Proceedings 4776, 2002, pp. 207-214.

* cited by examiner

*Primary Examiner*—Brian Healy
*Assistant Examiner*—Charlie Peng
(74) *Attorney, Agent, or Firm*—Buckingham, Doolittle & Burroughs, LLP; David P. Dureska; Brent L. Moore

(57) ABSTRACT

The invention relates to a light emitting device consisting of one or more light sources coupled to a light guide containing diffuser particles having a refractive index close to the refractive index of the core of the light guide. The diffuser particles cause a scattering of the light emitted from the light sources so that light emitted from the light emitting device has colour variation imperceptible to the human eye and small and gradual variations in intensity.

39 Claims, 2 Drawing Sheets

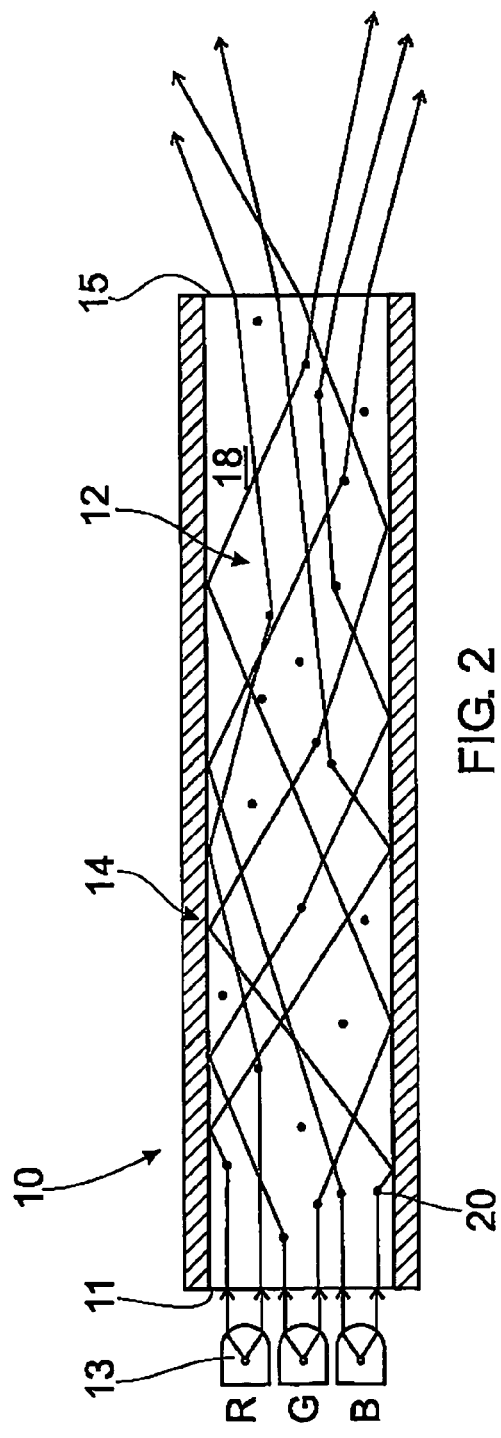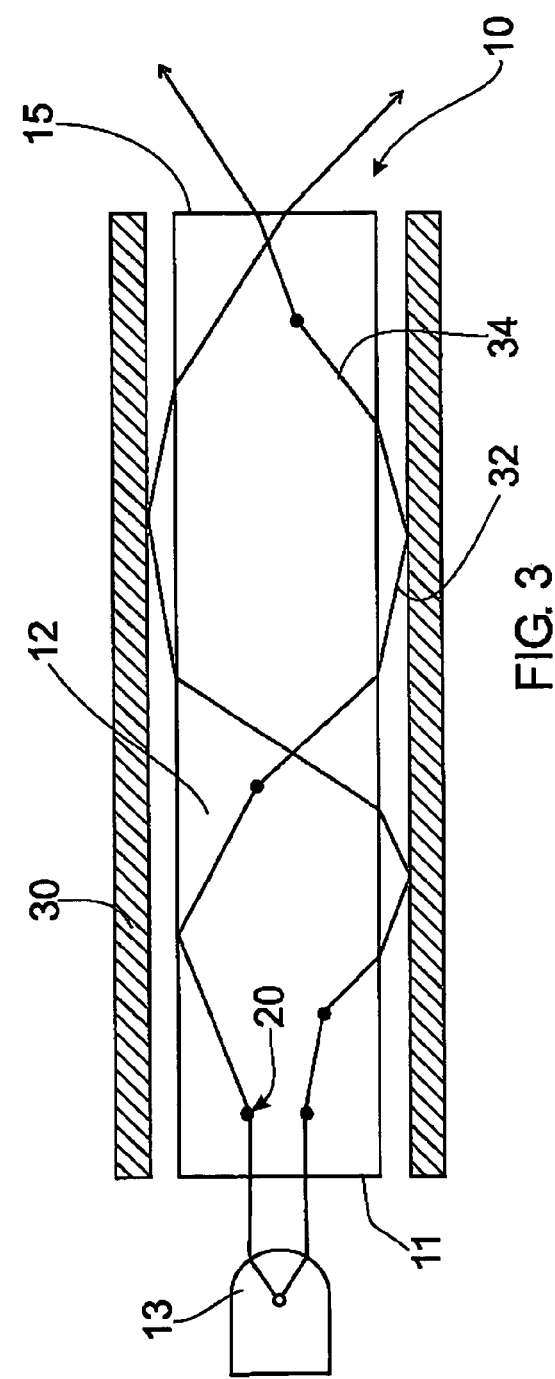

LIGHT EMITTING DEVICE

FIELD OF THE INVENTION

The invention relates to a light emitting device. In particular, although not exclusively, the invention relates to a light emitting device for mixing light from one or more sources and outputting light having colour variations imperceptible to a human eye and only small and gradual variations in intensity. The invention also relates to a light emitting device for mixing red, green and blue light and outputting white light having colour variations imperceptible to a human eye and only small and gradual variations in intensity. The invention also relates to energy efficient mixing or homogenizing the light output of an optical system and hence achieving maximum utilization of lumens emitted from the one or more sources. However, it is envisaged that the invention has other applications.

BACKGROUND TO THE INVENTION

It is often necessary to combine the output from one or more light sources in an optical system. This may involve mixing light of the same wavelength from single or multiple sources or may involve mixing light of different wavelengths from multiple sources. A particularly important example is the production of white light by combining the output from discrete red (R), green (G) and blue (B) LED's. Efficient white light production from RGB LED arrays is a crucial enabling technology for the widespread use of LEDs for general lighting. RGB LED arrays are far more energy efficient than known LEDs based on phosphors. Improvements in the energy efficiency and effectiveness of mixing light, and in particular mixing light from LEDs, are therefore desirable to enable use of LED arrays in place of phosphor and related conversion systems to produce white light. Energy efficiency in lighting is usually measured in lumens provided per Watt of power used to supply these lumens.

An important factor is that the human eye is very sensitive to slight variations in colour. Therefore, one problem encountered in the mixing of light is that the required degree of colour uniformity, wherein colour variations in the resultant light are imperceptible to the human eye, cannot be achieved by current mixing methods without unacceptable losses.

Zhao, F. et al, "Optical Elements for Mixing Coloured LEDs to Create White Light", conference paper 4776-35 at SPIE International Symposium on Optical Technology (SPIE's 47th Annual meeting, July 2002), published in Solid State Lighting II: Proceedings of SPIE volume 4776, pages 206–214, (2002) disclose an experimental investigation into the problems encountered and illustrates the deficiencies of the current state-of-the-art. Zhao, F. et al disclose using optically clear, acrylic light guides of square and circular cross section and of various lengths (76 mm, 152 mm, 305 mm) to mix red, green and blue light from an RGB LED array comprising 18 LED's.

The light guides were not found to significantly improve the beam uniformity in terms of illuminance and colour and there was no appreciable difference in the quality of the light produced by the different shaped light guides. The system energy efficiency deteriorated as a function of length as expected. The only improvement in illuminance and colour uniformity was achieved by diffusing the output ends of the light guides, which incurred further deterioration in efficiency.

Generation of white light is not the only application requiring efficient mixing of laser diode or LED output. Photo-curing of cements, such as dental cement requires a uniform illumination of the photosensitive material. Existing systems based on light guides produce uneven illumination giving unsatisfactory curing.

Hence, there is a need for a means of combining the output from one or more light sources to achieve output light with good uniformity of both colour and intensity across the output area. It is also desirable to have the ability to combine light from multiple sources without greatly increasing the angular spread of the input light and to make full use of the lumens supplied by the one or more sources.

DISCLOSURE OF THE INVENTION

In one form, although it need not be the only or indeed the broadest form, the invention resides in a light emitting device comprising:

a light guide having an elongate transparent core surrounded by an optically transmitting sheath;

one or more light sources coupled to a first end of said light guide; and transparent diffuser particles distributed within the core to scatter light in a substantially forward direction from the first end of said core toward a second end of said core;

wherein the diffuser particles have a refractive index close to that of the core, low back reflectance and low absorbance.

Suitably, the light emitting device emits light having colour variations imperceptible to a human eye and small and gradual variations in intensity.

Said imperceptible colour variations and small and gradual variations in intensity in said emitted light occur across said second end of said core and in the far field.

The core is preferably a polymer. Alternatively, the core may be glass.

Preferably, the optically transmitting sheath has a lower refractive index than the core. Preferably, the sheath is a cladding of low refractive index polymer. Suitably the cladding polymer is a fluoro-polymer. Alternatively, the sheath may be a cladding of aerogel or low refractive index glass. Alternatively, the sheath may be a layer of water, low refractive index liquid, air, other gas or vacuum. Alternatively, the sheath may be opaque and reflective. Preferably, the sheath is non-absorbing.

The diffuser particles are preferably transparent.

The diffuser particles are preferably made from a polymer and may be a cross-linked polymer, such as PMMA or polystyrene. Alternatively the diffuser particles may be made from transparent non-polymeric materials such as glass.

The diffuser particles are preferably spherical. Alternatively, the diffuser particles may be cylindrical, polyhedral, ellipsoidal or asymmetrical in shape.

Preferably, the diffuser particles yield a high ratio of angular deviation to back reflection of the light The diffuser particles are preferably selected to have a refractive index close to the refractive index of the core. The refractive index ratio of the diffuser particles, m, is defined as m=(refractive index of the diffuser particles)/(refractive index of core)=$1+\mu$. Preferably $|\mu|<0.035$ at the lights average wavelength. In one embodiment, $\mu=0.018$ at a wavelength of 589 nm.

In another embodiment, $\mu=0.011$ at a wavelength of 589 nm.

Preferably the average angle that light is scattered by the light guide is essentially constant over the light's wavelength range.

The average angle that light is scattered by a diffuser particle increases with |μ|. Preferably μ is essentially-constant over the light's range of wavelength.

Since the scattering power of small particles with constant μ varies with wavelength it is preferable that the size of the diffuser particles is substantially greater than that of the light's wavelength. Preferably the size of the diffuser particles exceeds 5 micrometers.

A concentration of diffuser particles in the core and a length of the light guide may be varied to achieve the colour variations imperceptible to a human eye and the small and gradual variations in intensity in said emitted light.

Preferably where multiple light sources are used said light sources have similar angular distribution functions. In a particularly preferred embodiment, when light sources of disjoint wavelength ranges are used the angular distribution functions of all sources are closely matched.

Suitably, the concentration of the diffuser particles in the core varies along the length of the core.

In one form, said light guide comprises an axial diffuser particle number (the average number of diffuser particles a ray parallel to a longitudinal axis of the light guide would intercept if it were to pass through the guide undeviated) in the range of about 6–50. Preferably, said axial diffuser particle number is in the range of about 20–40.

In another form, said light guide comprises an axial diffuser particle number in the range of about 50–300.

Each of said one or more light sources may be an LED, an incandescent source such as a lamp filament, a discharge lamp, a laser, or other high brightness source.

Suitably, said light emitting device further comprises control means for controlling the output of said one or more light sources across a range of wavelengths.

Said light sources may be in the form of an LED array. Said LED's may emit light of the same colour or light of different colours. Suitably, each LED of said LED array emits red, green or blue light, wherein the relative outputs of said LEDS are adjusted via said control means such that said light emitted from said second end of said core is tunable across the colour gamut The light guide may be surrounded with a coaxial reflector to reflect light escaping from said core back through said core towards the second end of said core, said reflected light increasing the luminous output of said light guide.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein:

FIG. 2 is a schematic longitudinal sectional view of the light emitting device mixing red, green and blue light from an array of red, green and blue LEDs;

FIG. 3 is a schematic longitudinal sectional view of the light emitting device of FIG. 2 including a coaxial reflector.

DETAILED DESCRIPTION OF THE INVENTION

Figure 1:
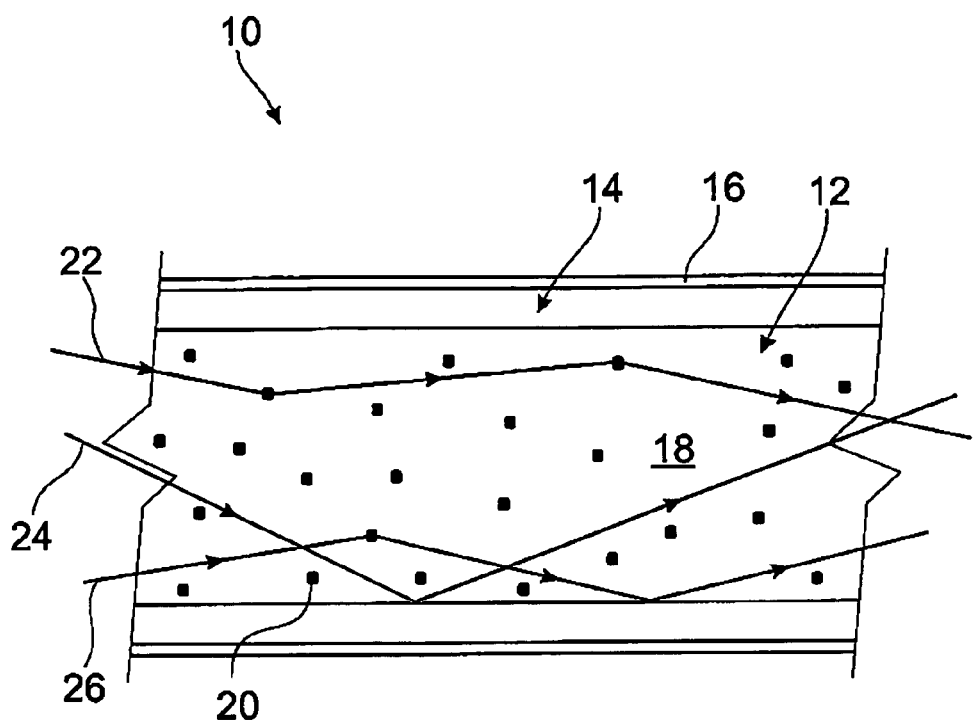
FIG. 1 is a schematic longitudinal sectional view of an embodiment of the light guide of the light emitting device showing the manner in which the diffuser particles scatter light and how light is reflected from the core-sheath interface.

Referring to FIG. 1, one embodiment of the light emitting device of the present invention comprises a light guide 10, which generally comprises a polymer core 12, a low refractive index polymer cladding 14 and may further comprise a polymer jacket 16. The low refractive index polymer cladding 14 encases the polymer core 12 and the polymer jacket 16 encases the tubular polymeric cladding 14. The polymer jacket 16 is a clear protective layer and is an optional feature of the present invention.

The cylindrical polymer core 12 is formed from a bulk medium in the form of a polymer matrix 18, which is impregnated with diffuser particles 20. Generally, the diffuser particles 20 individually give only a small deviation to light rays incident upon them whilst having a high transmittance, low back reflectance and low absorbance. Particularly, the light guide 10 may utilise transparent diffuser particles that are closely refractive index matched with the polymer matrix 18. A refractive index mismatch of a few percent is typical.

In one embodiment the polymer matrix 18 is formed of Poly-methyl methacrylate (PMMA) and the polymer cladding 14 is formed of poly-tetra-fluoro-ethylene (PTFE). The diffuser particles 20 may be formed of a cross-linked polymer, which is capable of being added to heated MMA without the diffuser particles 20 dissolving. The cylindrical polymer core 12 is polymerised with the diffuser particles 20 in situ.

In an alternative embodiment, the diffuser particles 20 are formed of cross-linked PMMA particles embedded within a polymer matrix 18 made from a polymerised acrylate mixture consisting primarily of methyl methacrylate (MMA) and allyl diglycol carbonate (CR39). Alternatively, BMA (butyl methacrylate) may be substituted for MMA.

In another embodiment, the cylindrical polymer core 12 is formed, for example, by extrusion or injection moulding from a bulk medium in the form of a polymer matrix 18, which is impregnated with diffuser particles 20. In a preferred embodiment the cylindrical polymer core 12 is formed by extrusion or injection moulding from uncross-linked PMMA and the diffuser particles 20 are formed of cross-linked PMMA, such that only the cross-linked PMMA diffuser particles do not melt during processing In another embodiment, the diffuser particles may be made from polystyrene. In another embodiment the polystyrene is cross-linked.

In yet another embodiment, the cylindrical core 12 is formed of glass by extrusion or moulding from a bulk medium in the form of a glass matrix 18, which is impregnated with diffuser particles 20. The diffuser particles 20 are of a form that can resist the high temperature of the molten glass. Silica is known to be a suitable material for such diffuser particles 20.

The concentration of diffuser particles 20 is chosen such that, on average, the light undergoes a large, but not excessive, number of interactions with the diffuser particles. In FIG. 1, incident ray 22 undergoes two interactions with the diffuser particles in the section of light guide 10 shown. Incident ray 24 passes through the section of light guide shown without undergoing any interactions with the diffuser particles, but is reflected within the polymer core 12. Incident ray 26 undergoes a combination of scattering by a diffuser particle and reflection at the polymer/cladding interface.

The refractive index ratio, m, of the diffuser particles 20 is defined as m=(refractive index of diffuser particle 20)/ (refractive index of polymer matrix 18)=1+μ. At any given interaction of a light ray with a diffuser particle, the deviation due to refraction is proportional |μ|. (The far-field deviation patterns for particles with μ and −μ are very similar.) However, the fraction of light back reflected is of order μ². Therefore, if the refractive indices are close, i.e. having a difference of only a few percent, it is possible to have virtually all the light incident on a particle forward transmitted with small angular deviation while back reflection is negligible. Also, the diffuser particles 20 are transparent and therefore there is almost no absorption. Thus this combination enables maximum energy efficiency in the mixing process.

Each individual deviation of a light ray at a diffuser particle 20 is small and the total deviation tends to increase with the number of interactions. Since there are very low reflection losses, the light rays can be made to undergo many such deviations in the light guide 10 by selecting the appropriate combination of diffuser particle concentration and path length. Hence the final average deviation can be made as large as desired. Losses due to absorption and back reflection are small compared to conventional diffuser systems.

Note that some optical systems lose light if the deviation angle is too large (for example, light in an optical fibre escapes when it deviates too much from the fibre axis). In these cases, the number of interactions with diffuser particles is chosen so there are enough interactions for adequate mixing of the light, but not so many that the losses become unacceptable.

Individual rays undergo both a large number of total internal reflections at the interface between the core 12 and the cladding 14 and a large number of essentially random deviations at diffuser particles 20 before they exit the light guide 10. This combination has superior mixing and diffusion properties to either effect acting by itself. This means that light originating at a particular point is diffused very uniformly by the light guide.

Rays that start off on almost identical paths diverge very rapidly and quickly achieve large differences in both angle and position. For example, with a 100 mm light guide comprising diffuser particles approximately 30 μm in diameter with μ=0.02 the median deviation at a diffuser particle is 2.2°. Consider two rays that are initially parallel, but separated by 35 μm (i.e. a little more than the diameter of a diffuser particle). The first interaction with a diffuser particle will cause them to diverge by about 2° since the separation between the rays is greater than the particle diameter, which means that the rays cannot both strike that particle. Even if there were no further deviations (and there will typically be several dozen), a 2° deviation over 100 mm gives a lateral separation of 3.5 mm i.e. one thousand times the initial separation. In practice, separations between individual rays of even a few micrometers lead to widely separated paths. In contrast, purely reflective prior art light guides allow some parallel rays to travel long distances without diverging, resulting in poor mixing of the light.

As another example, consider a pair of rays that start from the same point but have a small angular separation. If they diverge laterally by more than a particle diameter they will strike different diffuser particles and will rapidly diverge by macroscopic amounts. (In practise, a lateral divergence of a small fraction of the particle diameter will suffice for rapid divergence of the light rays). An upper bound in this example is a lateral divergence of a diffuser particle diameter at half the length of the light guide 10, i.e. 30 μm at 50 mm or 0.034° for the light guide in the example above. Therefore, rays starting at a given point will end up very widely separated if the lateral divergence is greater than this limit. In practise, separations of even a few seconds of arc lead to widely separated paths and exit angles at the second end of the light guide differing by a few degrees.

The net result of the extreme sensitivity to initial position and entry angle is that light rays from any extended source are very thoroughly diffused and mixed without having their angular spread increased unduly. Thus if light from proximate sources (such as an array of LED's) enters the light guide, the light will emerge very thoroughly mixed. In contrast, purely reflective light guides do not achieve the same level of mixing. The transmission function for these light guides often varies so slowly with position and angle that the emerging light has (highly objectionable) bright caustic lines at the end of the light guide and in the far field pattern. Contrastingly, the transmission function for light guides of the present invention is almost chaotic (minute variations in the input parameters lead to major variations in the output parameters) and so caustics are absent.

FIG. 2 shows a light guide 10 of the present invention comprising polymer core 12, polymer cladding 14, and diffuser particles 20, as described above. A first end 11 of the core of the light guide 10 is illuminated with red, green and blue light from an LED array 13. The red, green and blue light entering the light guide is scattered primarily in the forward direction by the diffuser particles 20. The scattered light may also undergo multiple reflections from the sides of the light guide 10. Any light entering first end 11 of the light guide core at a sufficiently large angle to the longitudinal axis of the core may initially be reflected at the interface between the core 12 and the cladding 14 before being scattered by diffuser particles 20.

Light emitted from second end 15 of the light guide will be a thorough mixture of the light entering the first end 11 of the light guide 10. The emitted light has variations in colour that are imperceptible to the human eye and only small and gradual variations in intensity. These characteristics are present in the emitted light both at the second end of the core and in the far field. In this example, the emitted light will be white light.

A useful parameter for describing the light guide 10 is axial particle number, a, which is the average number of particles an axial ray would encounter if it were to pass through the light guide undeviated. The random walk of a real axial ray as it is deviated by diffuser particles means that real rays typically encounter more diffuser particles than a. Light rays entering the light guide at an angle to the longitudinal axis of the core typically encounter a substantially larger numbers of particles than a. In a homogenous material, the axial particle number a equals the product of the linear particle frequency (the number of particles an undeviated ray would encounter per meter) and the axial length of the light guide 10.

The design of diffusers for optical systems employing high brightness sources is often driven by the need to minimise the fraction of light that is transmitted specularly i.e. transmitted without any spreading what so ever. With traditional diffusers this usually requires accepting substantial back reflection and hence reduced efficiency. Contrastingly, the present invention offers extremely low specular transmission combined with very low back reflection. Consider a line parallel to longitudinal axis of the light guide. The average number of diffuser particles 20 that it intersects is the axial particle number, a. Now the diffuser particles are arranged randomly so the expected number of particles a ray parallel to the longitudinal axis will encounter forms a Poisson distribution of mean a. Thus the probability of a ray passing through the system undeviated is less than $e^{-a}$ (rays at an angle to the longitudinal axis will on average encounter more than particles). For a (typical) axial particle number of 30 this is an undeviated fraction of less than $9.4 \times 10^{-14}$. For an axial particle number of 10 the undeviated fraction is less than 0.005%.

With reference to FIG. 2, solid core, flexible optical light guides of the type described above (with cores of a polymerised acrylate comprising BMA and allyl diglycol carbonate (CR39)) were illuminated with the LED array 13 comprising the red, green and blue LED's. The light guides were of various lengths and were typically about 12 mm in diameter. The light guides contained various concentrations of diffuser particles 20. The diffuser particles were about 33 μm diameter microspheres of cross-linked PMMA with a refractive index 1.8% higher than the polymer matrix 18 at a wavelength of 589 nm. The output from the light guides was visually examined by shining it on a white diffusing surface located about 30 cm from the second ends of the light guides.

The initial tests were carried out with various lengths of clear light guide (without diffuser particles) as controls. It was observed that even light guides many metres long gave incomplete mixing of the light with an output that had highly objectionable caustics, coloured patches and intensity variations.

One series of experiments was carried out in a light guide with a linear diffuser particle frequency of 30 particles per meter. With a 0.91 m length of light guide, (axial particle number approximately 27, (0.91 m×30 particles per meter=27 particles)), the output light had variations in colour that were imperceptible to the human eye and possessed only small and gradual variations in intensity. This was so at the second end 15 of the light guide 10 and in the far field. There was minimal apparent loss of light through the sides of the light guide. A 0.60 m length of the same light guide (axial particle number 18) gave faint variations in colour. A 0.31 m length (axial particle number 9) exhibited distinct variations in colour in the output light.

A second series of experiments was carried out in a light guide with a linear diffuser particle frequency of 66 particles per meter. With a 0.60 m length of this light guide, (axial particle number 40), the output light had variations in colour that were imperceptible to the human eye and possessed only small and gradual variations in intensity. This was so at the second end 15 of the light guide 10 and in the far field. There was minimal apparent loss of light through the sides of the light guide. A 0.30 m length of the same light guide (axial particle number 20) gave some regions of faint colour and some regions of strong colour in the output light.

A third series of experiments used a PMMA rod doped with diffuser particles at a linear diffuser particle frequency of approximately 1650 particles per meter. The rod was surrounded by air that served as the low refractive index sheath of the light guide. The refractive index difference between the polymer matrix and the diffuser particles was only 1.1%. This meant that at each interaction the deviation angle was only about two thirds of that for the previous experiments. The output light had variations in colour that were imperceptible to the human eye and possessed only small and gradual variations in intensity using a 0.153 m length of the rod (axial particle number 250). These characteristics were present in the light across the second end 15 of the light guide 10 and in the far field. There was significant apparent loss of light through the sides of the rod. This is not unexpected given the large number of interactions with diffuser particles 20.

A broad range of shapes for the diffuser particles function satisfactorily. Light striking a diffuser particle will be deviated by refraction as long as the entry and exit surfaces are not parallel and therefore approximately spherical shapes tend to be more effective than flat flakes. Cylinders, polyhedrons, ellipsoids or irregular shapes are also acceptable. If the particles are strongly asymmetric then it is desirable to randomise the particle orientations.

It is desirable, but not essential that the size of the diffuser particles 20 is several times the wavelength of the light they are to diffuse. If the particle size is comparable to the wavelength of light then reflection may be excessive. Additionally, the deviation from particles comparable in size to the wavelength of light is strongly wavelength dependent. This means that the average deviation angle and hence the total deviation angle will vary with wavelength. In extreme cases, this may cause the exiting beam to vary in colour with exit angle. For nanometer-sized particles the deviation may be too small to be useful.

It is desirable that the difference in refractive indices between the diffuser particles 20 and the polymer matrix 18 does not vary too much over the wavelength range of the light emitted by the one or more sources. The refractive index ratio, m, of the diffuser particles 20 is m=(refractive index of the diffuser particles 20)/(refractive index of core 18)=1+μ. The average deviation angle from the interaction with a single particle is proportional to |μ|. So if μ varies with wavelength, so does the average deviation angle and hence the total deviation angle. In extreme cases, this may cause the exiting beam to vary in colour with exit angle.

It is desirable that the mismatch in refractive indices is neither too large nor too small. A value of a few percent works well for most applications. If the refractive index mismatch is too small then it is necessary to have a large number of interactions in order to achieve even a small degree of diffusion. Also, the unavoidable differences in dispersion between the polymer matrix 18 and diffuser particles 20 means that it is hard to avoid variations in average deviation angle with wavelength. The refractive index of all known materials varies with wavelength. However, the mean deviation angle depends on the small difference in refractive index between the diffuser particle 20 and the polymer matrix 18. Unless the variations in wavelength are exactly the same the difference in refractive index will vary with wavelength. The relative effect of any such variation will be less if the mismatch is large.

On the other hand, if the mismatch in refractive index is too large then each individual interaction with a diffuser particle 20 gives rise to a relatively large deflection angle. Total deflection angles are usually limited to minimise losses through the sides of the light guide 10. Therefore, for a given total deflection angle there must be a low axial particle number a. However, a low axial particle number may not provide enough interactions to achieve good mixing and minimal undeviated light. Better randomisation of the interactions and therefore better mixing is achieved with a large number of small interactions than with a small number of large interactions. Also, if the refractive index mismatch is too large there may be excessive back reflection. The net result of all these tradeoffs is that for a given light guide there is an optimum value of μ. A refractive index mismatch of a few percent works well for most applications.

Back reflection from the interior of the light guide 10 is not usually significant. The average reflection coefficient, R, at a diffuser particle 20 is of order $\mu^2$ and hence is very small. For particles with m=1.010, the Fresnel reflection from a single particle is order of 0.001%. The total reflection from the interior of the light guide 10 is approximately equal to the product of the reflection from an individual diffuser particle and the axial particle number. So if m=1.010 and a=30 the total back reflection is of order 0.3%, which is negligible. These calculations of low back reflection are confirmed by numerous experimental observations of cross-linked PMMA diffuser particles in PMMA.

Absorption by the diffuser particles 20 is also usually not a problem. The light passes through about a particles and therefore, for a light guide with a=30 and 33 μm diameter particles, the light passes through a thickness of about 1 mm of diffuser particle. Hence, the diffuser particles do not have to be very transparent to keep the absorption losses small. Losses in the light emitting device of the present invention due to absorption in the diffuser particles are typically much less than one percent.

The required axial particle number for a given degree of mixing is inversely related to the length of the system i.e. short systems require a larger number of interactions to achieve adequate mixing. However, increasing the axial particle number increases the maximum deviation angle and therefore increases the fraction of light that escapes through the side of the light guide.

Therefore, with reference to FIG. 3, in which features common to FIGS. 2 and 3 are referred to by common reference numerals, the light guide 10 may be surrounded with a coaxial reflector 30 so that escaping light, such as light ray 32, is reflected back into the light guide, as represented by light ray 34. The preferred characteristics of the coaxial reflector 30 depend upon how far on average the light has to travel after it first exits a side of the core 12 compared to the dimensions of the core 12. The effective aspect ratio is defined as the average value of (distance from end surface 15 to a light ray's initial exit from a side of the core 12)/(smallest transverse dimension of the core 12). FIG. 3 illustrates a system with an effective aspect ratio of approximately 2.4.

If the effective aspect ratio is large compared to 1 then it is preferable that the coaxial reflector 30 is highly specularly reflecting. A high degree of smoothness of the interior surfaces of coaxial reflector 30 is desirable as smoothness enhances the specular reflectivity. A modest degree of small angle scattering is acceptable, but significant back scattering is undesirable. The absorption should be as low as possible.

Preferably the surface of the coaxial reflector 30 is formed of a highly reflecting metal such as silver or aluminium. The reflecting metal surface may be present in the form of a surface of bulk material or as a film on the inside of a suitable support in another embodiment the coaxial reflector 30 is a multi-layer dielectric film. Alternatively, the grazing incidence nature of the light ray 32 means that bulk dielectrics such as glass or polymer can also be used for the coaxial reflector 30. The reflectivity of a bulk dielectric coaxial reflector 30 may be enhanced by incorporating suitable additives such as mica.

As the effective aspect ratio decreases, the importance of high specularity for the coaxial reflector 30 also tends to decrease. If the ratio is comparable to or less than 1 then a significant fraction of diffuse to specular reflection may be acceptable for coaxial reflector 30.

FIG. 3 shows an air gap between the polymer core 12 and the reflector 30, but this may be eliminated if desired. Alternatively, the air gap may be replaced with a low refractive index jacket if desired.

Some of the light reentering the light guide, such as light ray 34, may be scattered into a trapped path, i.e. scattered by a diffuser particle 20. Even if the light is not so scattered, it is propagating in the right direction. Note that the light exiting the core 12 of the light guide hits the reflector 30 at grazing incidence and so the reflection coefficient can be made to be very high. Thus light not bound inside the light guide 10 by total internal reflection is still utilized for mixing purposes by being reflected back into the core 12 of the light guide and made to travel for significant distances along the axis of the light guide. An additional advantage of systems incorporating a coaxial reflector 30 is that they can achieve a given degree of mixing with a smaller axial particle number, a, and can therefore be more compact than devices lacking such reflectors.

Figure 4:
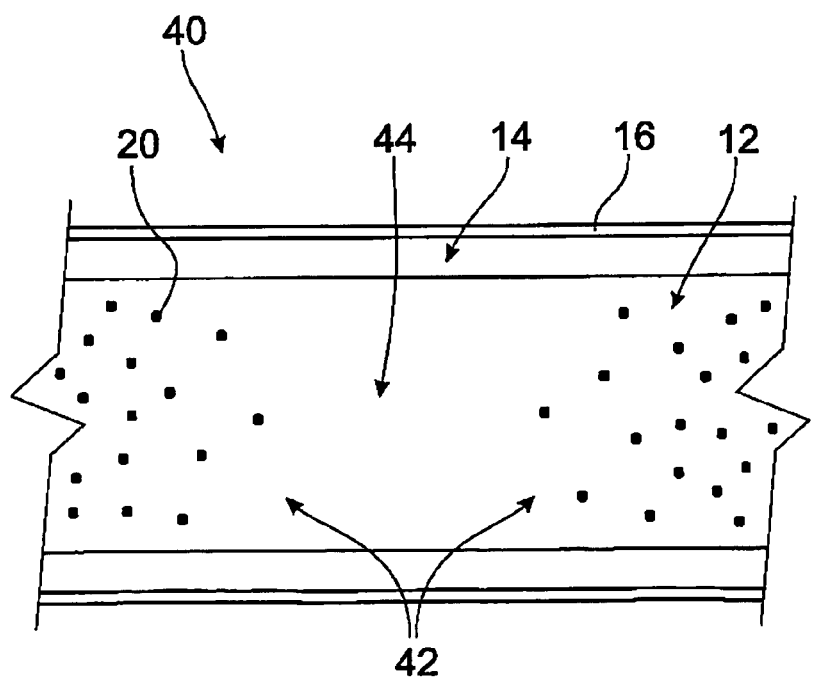
FIG. 4 shows variable concentration of the diffuser particles along the length of the light guide.

With reference to FIG. 4, another embodiment of the light emitting device of the present invention comprises a light guide core 12 with variable concentrations of diffuser particles 20 along the length of the light guide 40. Like features of FIGS. 1 and 4 are referred to by common reference numerals. The light guide 40 includes a polymer core 12, low refractive index polymer cladding 14 and the optional polymer jacket 16 as described above in relation to FIG. 1. In the longitudinal segment of the light guide 40 shown in FIG. 4, the diffuser particles 20 vary in concentration over regions 42 and are not present in region 44. Light travelling within the polymer core 12 is scattered when it comes into contact with regions 42, and passes through the regions 44 without being scattered. An advantage of systems with variable concentrations of diffuser particles 20 is that they may be more compact than systems of uniform diffuser particle concentration.

APPLICATIONS

The light emitting device of the present invention can be used to combine the output of many types of light sources and therefore has many applications. One application is to mix and combine the output from an array of light sources of the same colour to produce output light with greater uniformity across an exit aperture of the light guide in terms of colour and intensity.

For example, many dental fillings use photosensitive dental cement which is cured in a patient's mouth with a dental gun that uses a light guide system to convey light from a light source to the filling. It is of considerable importance that the photosensitive cement be illuminated substantially uniformly in order that every portion is correctly cured. Conventionally, the light source in the dental gun may be a single incandescent filament, an array of LEDs or some other convenient source. Conventional dental guns use an expensive array of small optical fibres to convey the light from the source to the filling. It has been proposed to use a light guide made from a single large optical fibre. However, it is known that conventional fibres have imperfect mixing and may give rise to a non-uniform output with hot spots and dark regions.

It is envisaged that the light emitting device of the present invention could be employed to mix the light to a very high degree of uniformity with negligible reflection or absorption losses.

Another application of the present invention is to make the output of conventional light guides more uniform. For example, a light source may be coupled by conventional optics to an optical fibre or optical fibre bundle. Known systems give a non-uniform output with undesirable peaks in the brightness of the exit beam. By making part, or the whole, of the light guides from the light guides of the present invention it is possible to achieve a very high degree of colour and intensity uniformity at the output. Alternatively, the output of conventional optical fibres may act as the light source(s) of the light emitting device of the present invention.

Another application of the present invention is to efficiently homogenise and make uniform the output from LED arrays used to back illuminate LCDs. Known systems using reflecting light guides have difficulty in achieving required light uniformity with low bulk, high efficiency and low cost. By making part, or the whole, of the light guides from the light guides of the present invention it is possible to achieve a compact system with a very high degree of colour and intensity uniformity at the output.

Another application of the present invention is to efficiently homogenise and make uniform the output from a LED or small number of LEDs used as the light source of an image projector. Known diffuser systems are inefficient and bulky. By making part of the image projector from the light emitting device of the present invention it is possible to achieve a compact system with a very high degree of colour and intensity uniformity at the output.

A further application of the light emitting device of the present invention is the production of colours that hitherto have been difficult or impossible to produce using conventional colour lighting technologies. For example, it is envisaged that any colour could be produced using controlled switching of an LED array comprising different coloured LEDs. Different combinations of coloured light could be produced from the array and input to a first end 11 of the core 12 of the light guide 10. The light rays of different colours from the different LEDs are thoroughly mixed through scattering and reflection within the core to emit light of a specific colour from the second end 15 of the light guide. A suitable control means may be employed to individually control the output of each LED. The light output from the second end 15 of the light guide may then be tuned across the colour gamut as desired. The emitted light will have minimal variations in hue, luminance and saturation both at the second end 15 of the light guide and in the far field due to the properties of the light guide 10 described above. The result will be light with colour variations imperceptible to the human eye and with only small and gradual variations in intensity.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A light emitting device comprising:
   a light guide having an elongate transparent core surrounded by an optically transmitting sheath;
   one or more light sources coupled to a first end of said light guide; and
   transparent diffuser particles distributed within the core to scatter light in a substantially forward direction from the first end of said core toward a second end of said core;
   wherein the diffuser particles have low back reflectance and low absorbance; and
   wherein the ratio of the refractive index of the diffuser particles to the refractive index of the core equals $1+\mu$, and $\mu$ has variance over a wavelength range of said one or more light sources; and
   wherein $0.010 \leq |\mu| 0.035$ at the average wavelength of the one or mote light sources.

2. The light emitting device of claim 1 wherein light emitted from the second end of the core has colour variation imperceptible to the human eye and gradual variations in intensity.

3. The light emitting device of claim 2 wherein a concentration of the diffuser particles in the core and a length of the light guide are varied to achieve the colour variations imperceptible to a human eye and the gradual variations in intensity in said emitted light.

4. The light emitting device of claim 1 wherein the optically transmitting sheath has a lower refractive index than the core.

5. The light emitting device of claim 1 wherein $\mu=0018$ at a wavelength of 589 nm.

6. The light emitting device of claim 1 wherein $\mu=0.011$ at a wavelength of 589 nm.

7. The light emitting device of claim 1 wherein the diffuser particles yield a high ratio of light that is forward transmitted with small angular deviation to back reflected light.

8. The light emitting device of claim 1 wherein a concentration of the diffuser particles in the core varies along a length of the core.

9. The light emitting device of claim 1 wherein said light guide comprises an axial diffuser particle number in the range of about 6–300.

10. The light emitting device of claim 1 wherein said light guide comprises an axial diffuser particle number in the range of about 6–50.

11. The light emitting device of claim 1 wherein said light guide comprises an axial diffuser particle number in the range of about 50–300.

12. The light emitting device of claim 1 wherein said axial diffuser particle number is in the range of about 20–40.

13. The light emitting device of claim 1 wherein the diffuser particles have a size substantially greater than a wavelength of light emitted by said one or more light sources.

14. The light emitting device of claim 1 wherein said one or more light sources are selected from: LEDs, incandescent sources, discharge lamps, lasers, or other high brightness sources.

15. The light emitting device of claim 1 further comprising control means for controlling the output of said one or more light sources across a range of wavelengths.

16. The light emitting device of claim 1 wherein said light sources are in the form of an LED array.

17. The light emitting device of claim 1 wherein said light sources are in the form of an LED array emitting red, green and blue light.

18. The light emitting device of claim 1 further comprising control means for controlling the output of said one or more light sources across a range of wavelengths, said one or more light sources being an LED array wherein the relative outputs of said LEDs are adjusted via said control means such that said light emitted from said second end of said core is tunable across a wavelength range of said one or more light sources.

19. The light emitting device of claim 1 comprising at least two light sources, each said light source emitting light having a characteristic angular distribution function, wherein the angular distribution functions of all light sources are similar.

20. The light emitting device of claim 19 wherein the angular distribution functions of all light sources are the same.

21. The light emitting device of claim 1 further comprising a coaxial reflector surrounding said light guide to reflect light escaping from said core back through said core towards the second end of said core, said reflected light increasing the luminous output of said light guide.

22. The light emitting device of claim 1 wherein the core is a polymer.

23. The light emitting device of claim 1 wherein the core is glass.

24. The light emitting device of claim 1 wherein the sheath is a cladding of low refractive index polymer.

25. The light emitting device of claim 24 wherein the polymer is a fluoro-polymer.

26. The light emitting device of claim 1 wherein the sheath is a cladding of aerogel or low refractive index glass.

27. The light emitting device of claim 1 wherein the sheath is selected from: a layer of water; a low refractive index liquid; air; other gas; or vacuum.

28. The light emitting device of claim 1 wherein the sheath is transparent.

29. The light emitting device of claim 1 wherein the sheath is translucent.

30. The light emitting device of claim 1 wherein the diffuser particles are made from a polymer.

31. The light emitting device of claim 30 wherein the diffuser particles are in the form of particles that are not dissolved by a monomeric mixture used to produce the polymer core.

32. The light emitting device of claim 30 wherein the diffuser particles are a cross-linked polymer, such as PMMA or polystyrene.

33. The light emitting device of claim 22 wherein the polymer core is formed by extrusion or injection moulding.

34. The light emitting device of claim 22 wherein the polymer core is formed by extrusion or injection moulding from uncross-linked PMMA and the diffuser particles are formed of cross-linked PMMA.

35. The light emitting device of claim 1 wherein the diffuser particles are made from transparent non-polymeric materials, such as glass.

36. The light emitting device of claim 1 wherein the diffuser particles are spherical.

37. The light emitting device of claim 1 wherein the diffuser particles are selected from one of: cylindrical; polyhedral; ellipsoidal; or asymmetrical in shape.

38. The light emitting device of claim 1 wherein the diffuser particles have a size in the range 5 µm to 50 µm.

39. The light emitting device of claim 1 wherein the diffuser particles have a size in the range 25 µm to 35 µm.

* * * * *

UNITED STATES PATENT AND TRADEMARK OFFICE
CERTIFICATE OF CORRECTION

| | |
|---|---|
| PATENT NO. | : 7,218,824 B2 |
| APPLICATION NO. | : 10/528319 |
| DATED | : May 15, 2007 |
| INVENTOR(S) | : James Bruce Franklin, Geoffrey Burton Smith and Edmond Kenneth Joseph |

It is certified that error appears in the above-identified patent and that said Letters Patent is hereby corrected as shown below:

IN THE CLAIMS:

Column 12, line 5, by deleting "$0.010 \leqq |\mu| \; 0.035$" and substituting therefor --$0.010 \leq |\mu| < 0.035$--.

Column 12, line 19, by deleting "$\mu = 0018$" and substituting therefor --$\mu = 0.018$--.

Signed and Sealed this

Fourteenth Day of August, 2007

JON W. DUDAS
*Director of the United States Patent and Trademark Office*